United States Patent
Pham et al.

(10) Patent No.: US 7,357,166 B2
(45) Date of Patent: Apr. 15, 2008

(54) FLEXIBLE MANDREL FOR HIGHLY CONTOURED COMPOSITE STRINGER

(75) Inventors: Doan D. Pham, Tacoma, WA (US); Mark Tollan, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 645 days.

(21) Appl. No.: 10/904,717

(22) Filed: Nov. 24, 2004

(65) Prior Publication Data
US 2006/0108057 A1 May 25, 2006

(51) Int. Cl.
*B29C 65/70* (2006.01)
*B32B 37/10* (2006.01)
*B28B 7/30* (2006.01)

(52) U.S. Cl. ............... 156/382; 156/500; 156/581; 156/583.3; 425/403; 264/313

(58) Field of Classification Search ........... 156/245, 156/382, 500, 580, 581, 583.3; 264/313; 425/394, 403, 414; 428/573, 574, 575
See application file for complete search history.

(56) References Cited

U.S. PATENT DOCUMENTS 2,739,350 A   3/1956  Lampman
4,338,381 A * 7/1982  Rogers .................. 428/575
4,576,849 A   3/1986  Gardiner
4,786,456 A * 11/1988 Witte .................... 264/285

FOREIGN PATENT DOCUMENTS

GB         842815      7/1960
JP         58076217    5/1983
WO         WO9606726   3/1996

* cited by examiner

*Primary Examiner*—Richard Crispino
*Assistant Examiner*—Michael A Tolin
(74) *Attorney, Agent, or Firm*—Ostrager Chong Flaherty & Broitman P.C.

(57) ABSTRACT

An aircraft stringer lay-up assembly is provided comprising a contoured curing block and a first mandrel element positioned thereon. The first mandrel assembly includes a first bar assembly having a plurality of rigidity reducing first slots formed along a first mandrel length. The plurality of rigidity reducing first slots protruding partially through a first mandrel depth of the first mandrel element to allow the first bar assembly to conform to the contoured curing block. A composite ply assembly is laid up onto the first mandrel element and cured while conformed to said contoured curing block such that a contoured composite stringer element is generated.

23 Claims, 2 Drawing Sheets

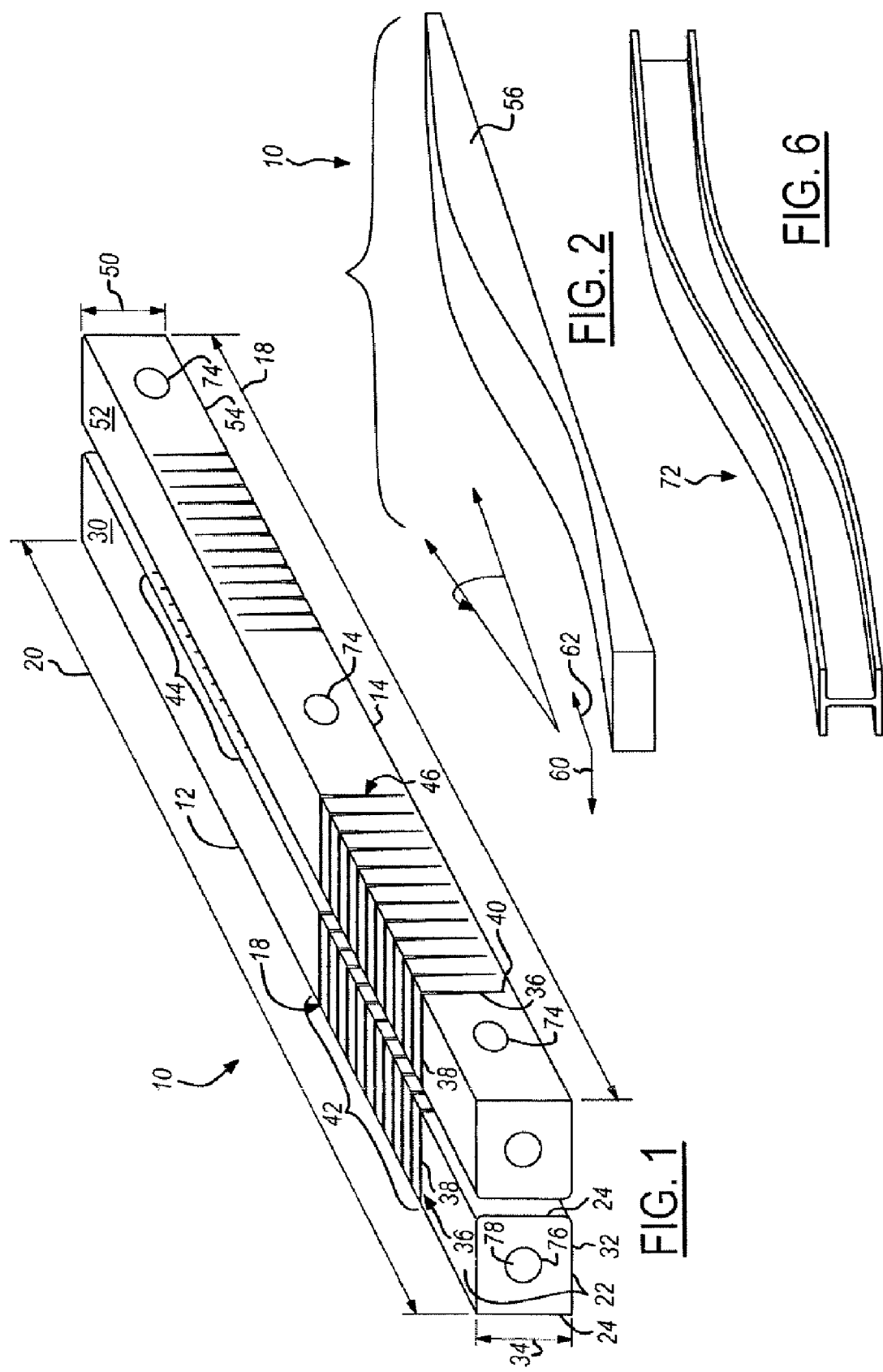

FLEXIBLE MANDREL FOR HIGHLY CONTOURED COMPOSITE STRINGER

TECHNICAL FIELD

The present invention relates generally to an aircraft composite stringer mandrel and more particularly to a flexible mandrel for the use with an aircraft stringer lay-up assembly to produce a contoured composite stringer element.

BACKGROUND OF THE INVENTION

Aircraft components such as stringers have become complex in design and shape due to developing aircraft designs. The complexity of shape in combination with a need for decreased weight/strength ratios requires the use of alternate construction technologies. For this reason, aircraft designers have turned to the use of composite ply assemblies for the manufacture of aircraft stringers. In these manufacturing scenarios, a material ply impregnated with epoxy or similar substance is layed-up onto a mandrel shaped to generated the complex shape. The composite ply assembly is then cured to generate a composite component with the desired complex shape.

Present aircraft designs, however, can require complex contours and twists which can be difficult to implement with existing mandrel technology. Present mandrel assemblies utilize either metal fabricated mandrels or composite mandrel assemblies. Present metal fabricated mandrels are highly resistant and exhibit long life spans. It is difficult, however, to configure these metal mandrel assemblies into the desired complex contours and twists. The common metal mandrel is too stiff to be forced into these contours. The common approach, therefore, has been to turn to composite mandrels capable of being forced into a wider range of complex contours. Composite ply mandrels, however, are easily damaged and have a considerably limited lifespan compared to the metal counterparts. As such, their use undesirably impacts the cost and time involved with composite stringer manufacturing.

It would therefore be highly desirable to have an aircraft stringer lay-up assembly that combined the flexibility and utility of composite mandrel assemblies with the resiliency and cost effectiveness of metal fabricated mandrel assemblies.

SUMMARY OF THE INVENTION

It is therefore an object to the present invention to provide an aircraft stringer lay-up assembly and method with improved flexibility to generate complex shapes, contours, and twists. It is a further object to provide such an aircraft stringer lay-up assembly with improved resiliency and lifespan as compared to composite mandrel assemblies.

In accordance with the objects of the present invention an aircraft stringer lay-up assembly is provided comprising a contoured curing block and a first mandrel element positioned thereon. The first mandrel assembly includes a first bar assembly having a plurality of rigidity reducing first slots formed along a first mandrel length. The plurality of rigidity reducing first slots protruding partially through a first mandrel depth of the first mandrel element to allow the first bar assembly to conform to the contoured curing block. A composite ply assembly is laid up onto the first mandrel element and cured while conformed to said contoured curing block such that a contoured composite stringer element is generated.

Other objects and features of the present invention will become apparent when viewed in light of the detailed description and preferred embodiment when taken in conjunction with the attached drawings and claims.

BRIEF DESCRIPTION OF THE DRAWINGS

FIG. 1 is an illustration of an aircraft stringer lay-up assembly in accordance with the present invention, the assembly illustrated showing a first and second mandrel assembly.

FIG. 2 is an illustration of a contoured curing block for use in the aircraft stringer lay-up assembly illustrated in FIG. 1.

FIG. 6 is an illustration of a contoured composite stringer element generated from the aircraft stringer lay-up assembly illustrated in the above figures.

DESCRIPTION OF PREFERRED EMBODIMENTS

Figure 3:
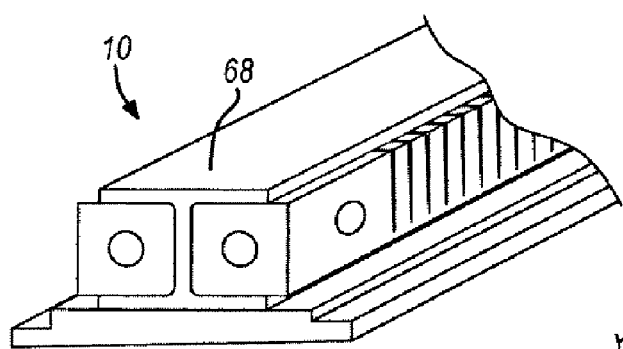
FIG. 3 is an illustration of an aircraft stringer lay-up assembly in accordance with the present invention, the illustration showing the arrangement of components from FIGS. 1 and 2 in addition to the composite ply assembly.

Referring now to FIG. 1, which is an illustration of an aircraft stringer lay-up assembly 10 in accordance with the present invention. The aircraft stringer lay-up assembly 10 includes a first mandrel element 12 and a second mandrel element 14. The mandrel elements 12, 14 are preferably elongated metal beams as illustrated. Traditional metal mandrel configurations suffer from an inability to conform to the complex arrangements necessary for modern stringer lay-up requirements. The present invention, however, provides a unique approach by constructing the first mandrel element 12 from a first bar assembly 16 having a plurality of rigidity reducing first elements 18 formed along its first mandrel length 20. Although a variety of rigidity reducing element 18 are contemplated, one embodiment contemplates the use of slots.

The first mandrel element 12 includes two mandrel vertical surfaces 22, two mandrel side surfaces 24, a right mandrel end surface 26 and a left mandrel end surface 28. The vertical surfaces 22 may be further defined as a first mandrel upper vertical surface 30 and a first mandrel lower vertical surface 32. The plurality of rigidity reducing first slots 18 protrude partially through a first mandrel depth 34 from one of the first mandrel vertical surfaces 22 through both of the mandrel side surfaces 24. This allows the first bar assembly 16 to flex and twist when a plurality of such rigidity reducing first slots 18 are introduced.

Although a variety of slot manufacturing and configurations are contemplated, one embodiment contemplates the use of a plurality of tapered slots 36, each of which has an open end 38 and a tapered end 40. The open end is formed on the first mandrel vertical surface 22 and the tapered end 40 is formed partially through the first mandrel depth 34 such that it is visible from both the first mandrel side surfaces 24. It should be understood that straight slots are also contemplated. The slots may be formed by wire electrical discharged machining such that they may be maintained as very thin slots so as not to disturb the lay-up surfaces of the first mandrel element 12. It is contemplated that the slots 18 will be kept less than 0.01 inches wide and in one embodiment they are 0.0065 inches wide. This allows the desired flexibility of the first mandrel element 12 without impacting lay-up surfaces.

The plurality of rigidity reducing first slots (elements) 18 may be formed in a variety of arrangements along the first mandrel length 20. In one embodiment it is contemplated that the rigidity reducing first slots 18 may be formed as a first group of rigidity reducing first slots 42 and a second grouping of rigidity reducing slots 44. The first grouping 42 is formed on the first mandrel upper vertical surface 30 while the second grouping 44 is formed on the first mandrel lower vertical surface 32. By positioning these groupings 42,44 remotely from one another, the first mandrel element 12 can be curved or bent in differing directions along its length. Each of the plurality of rigidity reducing slots 18 is preferably grouped such that the bending of the first mandrel element 12 tends to close the slots rather than open them. This again preserves the surfaces for lay-up. In the illustrated figure the groupings 42, 44 are positioned at opposing ends, however, a wide variety of groupings and spacings are contemplated. It is likewise contemplated that the second mandrel element 14 may be similarly comprised of a plurality of rigidity reducing second slots 46 along a second mandrel length 48. These second slots 46 protrude partially through a second mandrel depth 50 and may be positioned on either or both of the second mandrel upper vertical surface 52 or the second mandrel lower vertical surface 54.

Figure 5:
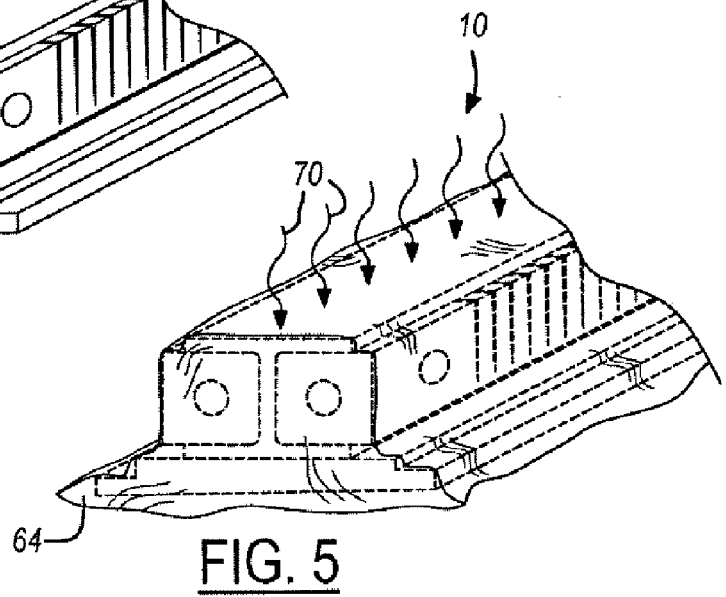
FIG. 5 is an illustration of the aircraft stringer lay-up assembly illustrated in FIG. 4, the assembly subjected to a curing process.
Figure 4:
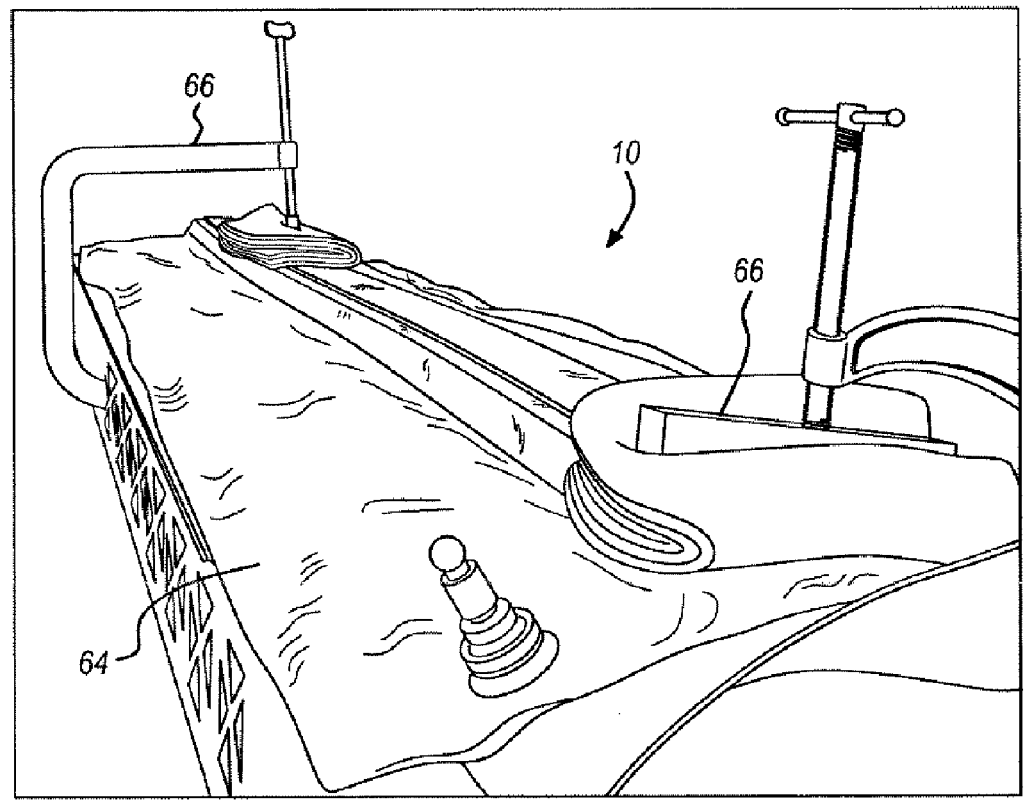
FIG. 4 is an illustration of the aircraft stringer lay-up assembly illustrated in FIG. 3, the illustration showing the addition of a vacuum bag assembly and clamping elements.

Although the plurality or rigidity reducing slots 18, 46 allow the mandrels to be conformed to a wise variety of complex contours, the present invention further contemplates the use of a contoured curing block 56 to facilitate such conformation (see FIG. 2). The contoured curing block 56 includes a complex contour 58 that can be complex in both a first curing block planar direction 60 and a second curing block planar direction 62. This allows twist to be induced. By placing the first mandrel element 12 and/or the second mandrel element 14 onto the contoured curing block 56, the weight of the mandrel can be utilized to conform it into the complex contour 58. Although weight alone may be utilized, it is further contemplated that a vacuum bag assembly 64 (see FIG. 5) or a clamping assembly 66 (see FIG. 4) may facilitate such conformation to the contoured curing block 56.

Once the mandrel elements 12,14 are conformed to the contoured curing block 56, a composite ply assembly 68 may be layed-up on the mandrel elements 12,14. The composite ply assembly 68 may be laid up between the mandrels 12,14 and even between the mandrels 12, 14 and the curing block 56. By laying up the composite ply assembly 68 between the mandrels 12,14 and over the upper vertical surfaces 30,52 and lower vertical surfaces 32,54, an I-beam arrangement is generated. The composite ply assembly 68 is subjected to curing, commonly through the application of a curing heat 70 (see FIG. 5), wherein it is hardened into a contoured composite stringer element 72 such as the contoured I-beam element illustrated in FIG. 6.

In addition to the main features of the present invention, the present invention further contemplates the use of a plurality of side positioning bores 74 positioned along the mandrel side surfaces 24. This allows the mandrel elements 12,14 to be easily moved and positioned on the contoured curing block 56. In addition, they may be utilized as additional clamping or weighting points to assure proper conformation with the curing block 56 in particularly complex surface areas. Additionally, the present invention contemplates the use of a central bore 76 formed through the first mandrel length 20. A center support wire 78 is positioned within the central bore 76 and runs the length of the first mandrel element 12. By inducing tension in the center support wire 78 the flexibility of the first mandrel element 12 may by varied thereby allowing the first mandrel element 12 to be utilized in a greater range of applications.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An aircraft stringer lay-up assembly comprising:
    a contoured curing block;
    a first mandrel element positioned on said contoured curing block, said first mandrel element comprises:
        an elongated beam having a plurality of rigidity reducing first slots formed along a first mandrel length, said plurality of rigidity reducing first slots protruding partially through a first mandrel depth of said first mandrel element to allow said elongated beam to conform to said contoured curing block;
        a central bore chamber formed in said elongated beam along said first mandrel length; and
        a center support wire positioned through said central bore chamber, said center support wire controlling flexibility of said elongated beam; and
    a composite ply assembly laid up onto said first mandrel element, said composite ply assembly cured onto said first mandrel element while conformed to said contoured curing block such that a contoured composite stringer element is generated.

2. An aircraft stringer lay-up assembly as described in claim 1, wherein said plurality of rigidity reducing first slots comprise:
    a plurality of tapered slots including an open end and a tapered end, said open end positioned along a first mandrel vertical surface, said tapered end positioned along a first mandrel side surface.

3. An aircraft stringer lay-up assembly as described in claim 1, wherein each of said plurality of rigidity reducing first slots comprises a wire electrical discharged machined slot.

4. An aircraft stringer lay-up assembly as described in claim 3, wherein each of wire electrical discharged machined slots is less than 0.01 inch wide.

5. An aircraft stringer lay-up assembly as described in claim 1, wherein said contoured curing block is contoured across a first curing block planar direction and a second curing block planar direction such that twist is induced in said first mandrel element.

6. An aircraft stringer lay-up assembly as described in claim 1, wherein said plurality of rigidity reducing slots comprise:
    a first group of rigidity reducing first slots positioned along a first mandrel upper vertical surface; and
    a second grouping of rigidity reducing slots positioned along a first mandrel lower vertical surface, said first group of rigidity reducing slots positioned remotely from said second grouping of rigidity reducing slots such that said first mandrel element may conform to said contoured curing block.

7. An aircraft stringer lay-up assembly as described in claim 1, wherein said first mandrel element further comprises:
a plurality of side positioning bores formed in said elongated beam.

8. An aircraft stringer lay-up assembly as described in claim 1, further comprising:
a vacuum bag assembly surrounding said contoured curing block, said first mandrel element, and said composite ply assembly, said vacuum bag assembly pressing said composite ply assembly against said first mandrel element during curing.

9. An aircraft stringer lay-up assembly as described in claim 1, further comprising:
a clamping assembly forcing said first mandrel element onto said contoured curing block.

10. An aircraft stringer lay-up assembly as described in claim 1, further comprising:
a second mandrel element positioned adjacent said first mandrel element on said contoured curing block, said second mandrel assembly including a plurality of rigidity reducing second slots formed along a second mandrel length, said plurality of rigidity reducing second slots protruding partially through a second mandrel depth of said second mandrel element to allow said second mandrel assembly to conform to said contoured curing block.

11. An aircraft stringer lay-up assembly as described in claim 10, wherein said composite ply assembly is laid up between said first mandrel element and said second mandrel element, said composite ply assembly extending over a first mandrel upper vertical surface and a second mandrel upper vertical surface, said composite ply assembly extending over a first mandrel lower vertical surface and a second mandrel lower vertical surface such that said contoured composite stringer element comprises a contoured I-beam element.

12. An aircraft stringer lay-up assembly comprising:
a first mandrel element comprising
a first elongated metal beam assembly having a plurality of rigidity reducing first elements formed along a first mandrel length, said plurality of rigidity reducing first elements allowing said first elongated metal beam assembly to be arranged in a complex contour;
a central bore chamber formed in said first elongated metal beam assembly along said first mandrel length; and
a center support wire positioned through said central bore chamber, said center support wire controlling flexibility of said first elongated metal beam assembly; and
a composite ply assembly laid up onto said first mandrel element, said composite ply assembly cured onto said first mandrel element while arranged in said complex contour such that a contoured composite stringer element is generated.

13. An aircraft stringer lay-up assembly as described in claim 12, further comprising:
a contoured curing block contoured across both a first curing block planar direction and a second curing block planar direction, said first mandrel element positioned on said contoured curing block to form said complex contour.

14. An aircraft stringer lay-up assembly as described in claim 12, wherein said plurality of rigidity reducing first element comprise:
a plurality of tapered slots including an open end and a tapered end, said open end positioned along a first mandrel vertical surface, said tapered end positioned along a first mandrel side surface.

15. An aircraft stringer lay-up assembly as described in claim 13, wherein each of said plurality of rigidity reducing first elements comprises a wire electrical discharged machined slot.

16. An aircraft stringer lay-up assembly as described in claim 15, wherein each of wire electrical discharged machined slots is less than 0.01 inch wide.

17. An aircraft stringer lay-up assembly as described in claim 13, wherein said plurality of rigidity reducing first elements comprise:
a first group of rigidity reducing slots positioned along a first mandrel upper vertical surface; and
a second grouping of rigidity reducing slots positioned along a first mandrel lower vertical surface, said first group of rigidity reducing slots positioned remotely from said second grouping of rigidity reducing slots such that said first mandrel element may conform to said contoured curing block.

18. An aircraft stringer lay-up assembly as described in claim 12, wherein said plurality of rigidity reducing first elements allow twist to be induced in said first elongated metal beam assembly.

19. An aircraft stringer lay-up assembly as described in claim 12, wherein said first mandrel element further comprises:
a plurality of side positioning bores formed in said first elongated metal beam.

20. An aircraft stringer lay-up assembly as described in claim 12, further comprising:
a vacuum bag assembly surrounding said contoured curing block, said first mandrel element, and said composite ply assembly, said vacuum bag assembly pressing said composite ply assembly against said first mandrel element during curing.

21. An aircraft stringer lay-up assembly as described in claim 12, further comprising:
a clamping assembly forcing said first mandrel element onto said contoured curing block.

22. An aircraft stringer lay-up assembly as described in claim 12, further comprising:
a second mandrel element positioned adjacent said first mandrel element on said contoured curing block, said second mandrel assembly including a plurality of rigidity reducing second slots formed along a second mandrel length, said plurality of rigidity reducing second slots protruding partially through a second mandrel depth of said second mandrel element to allow said second mandrel assembly to conform to said contoured curing block.

23. An aircraft stringer lay-up assembly as described in claim 22, wherein said composite ply assembly is laid up between said first mandrel element and said second mandrel element, said composite ply assembly extending over a first mandrel upper vertical surface and a second mandrel upper vertical surface, said composite ply assembly extending over a first mandrel lower vertical surface and a second mandrel lower vertical surface such that said contoured composite stringer element comprises a contoured I-beam element.

* * * * *